R. E. FIELDER.
AXLE DRIVE EQUIPMENT FOR MOTOR VEHICLES.
APPLICATION FILED MAR. 9, 1918.

1,291,816.

Patented Jan. 21, 1919.
3 SHEETS—SHEET 1.

INVENTOR
R. E. Fielder
BY
Rogers, Kennedy & Campbell
ATTORNEYS.

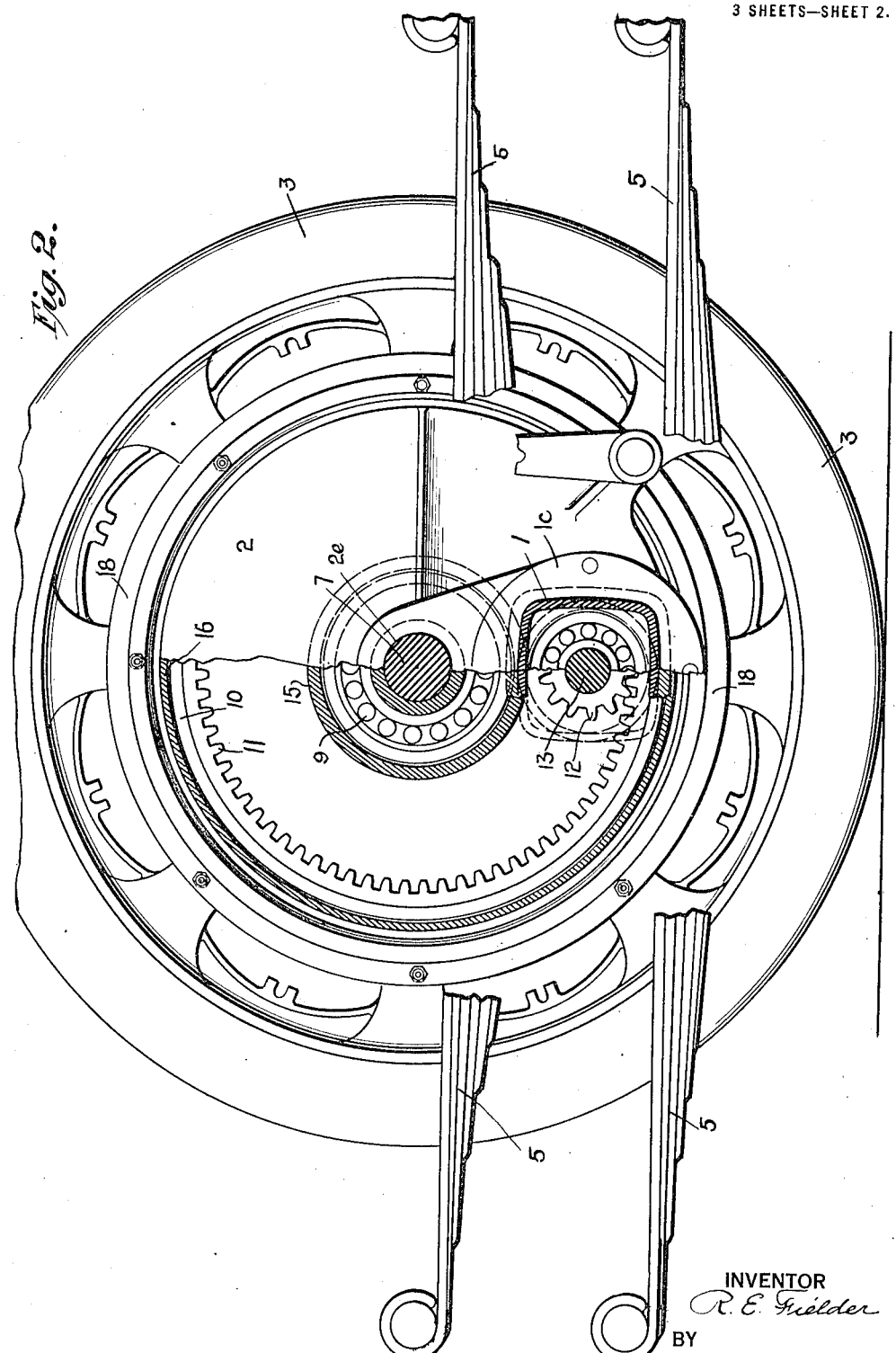

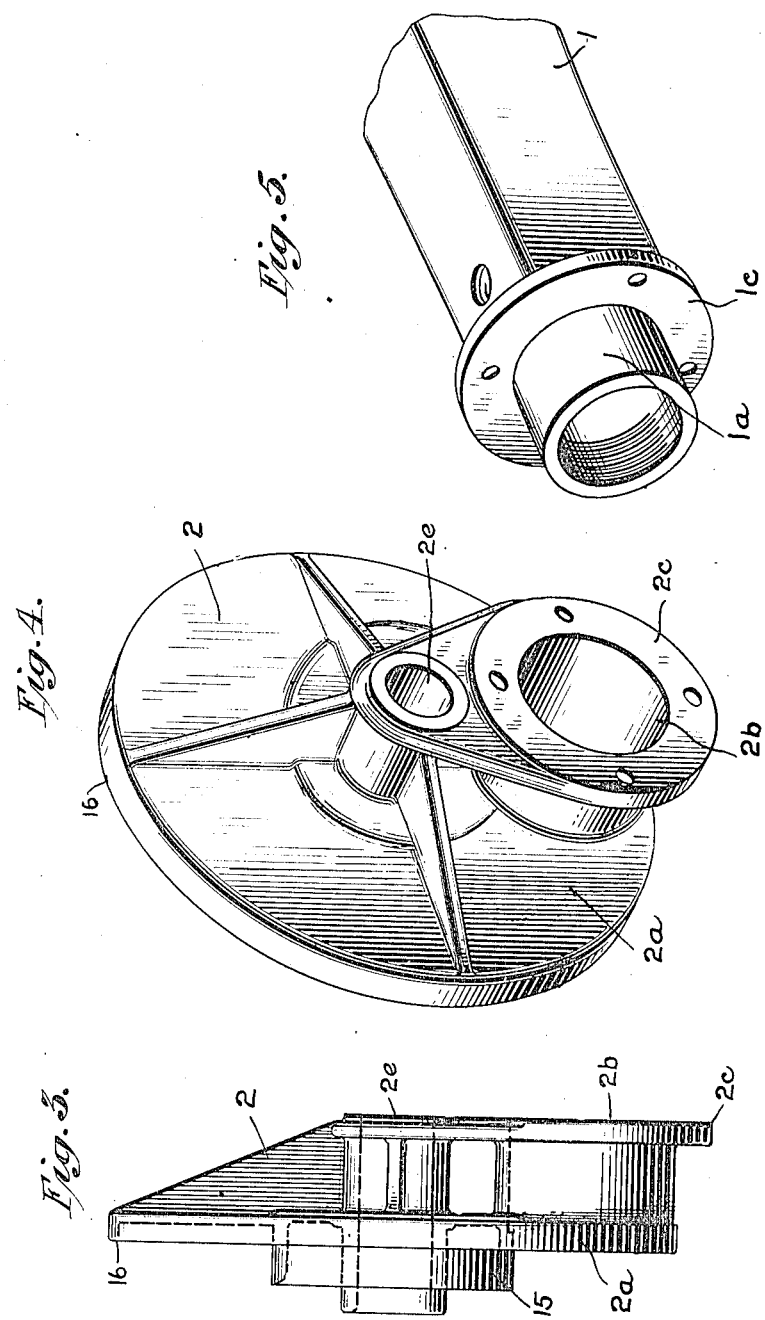

UNITED STATES PATENT OFFICE.

REUBEN E. FIELDER, OF NEW YORK, N. Y., ASSIGNOR TO FIFTH AVENUE COACH COMPANY, A CORPORATION OF NEW YORK.

AXLE-DRIVE EQUIPMENT FOR MOTOR-VEHICLES.

1,291,816.

Specification of Letters Patent.

Patented Jan. 21, 1919.

Application filed March 9, 1918. Serial No. 221,401.

*To all whom it may concern:*

Be it known that I, REUBEN E. FIELDER, a subject of the King of Great Britain, residing at New York, in the county of Bronx and State of New York, have invented certain new and useful Improvements in Axle-Drive Equipments for Motor-Vehicles, of which the following is a specification, reference being had therein to the accompanying drawing.

This invention relates to axle drive mechanisms of motor vehicles such as automobiles, auto buses, auto trucks, and the like, the invention having special reference to the rear axle drive equipment and having for its object the support of the vehicle body at a low level.

It is desirable in vehicles of this type to employ wheels of comparatively large diameter to produce the greatest smoothness in the travel over uneven or rough roads, it being usual where heavy loads are carried to use solid rubber tires instead of pneumatic tires. In order under these conditions, to support the body of the vehicle at a low level, it has been proposed to provide a transverse load-supporting member and to mount the wheels on this member on axes offset vertically above the member, motion being transmitted to the wheels by means of a driving shaft sustained by the member and geared to the wheels and receiving its motion from the motor or engine, and the vehicle body being sustained by the load-supporting member through the medium of the usual springs.

My invention has to do particularly with constructions of this type, and it consists in a transverse load-supporting member of improved form and construction; in improved means for mounting the wheels on said load-supporting member; in improved means for driving the wheels; and also in improved means for housing the driving gearing, all of which improvements will be fully described in the specification to follow and the novel features of which will be pointed out in the appended claims.

In the accompanying drawings:

Fig. 2 is a transverse sectional elevation on an enlarged scale on the line *b—b* of Fig. 1 as viewed in the direction of the arrow on said line.

Fig. 3 is an edge view of one of the bracket members on which the wheels are mounted on the transverse load-carrying member.

Fig. 4 is a perspective view of the same.

Fig. 5 is a perspective view of one end of the load-carrying member showing the form of said end to adapt the bracket member for attachment thereto.

Figure 1:
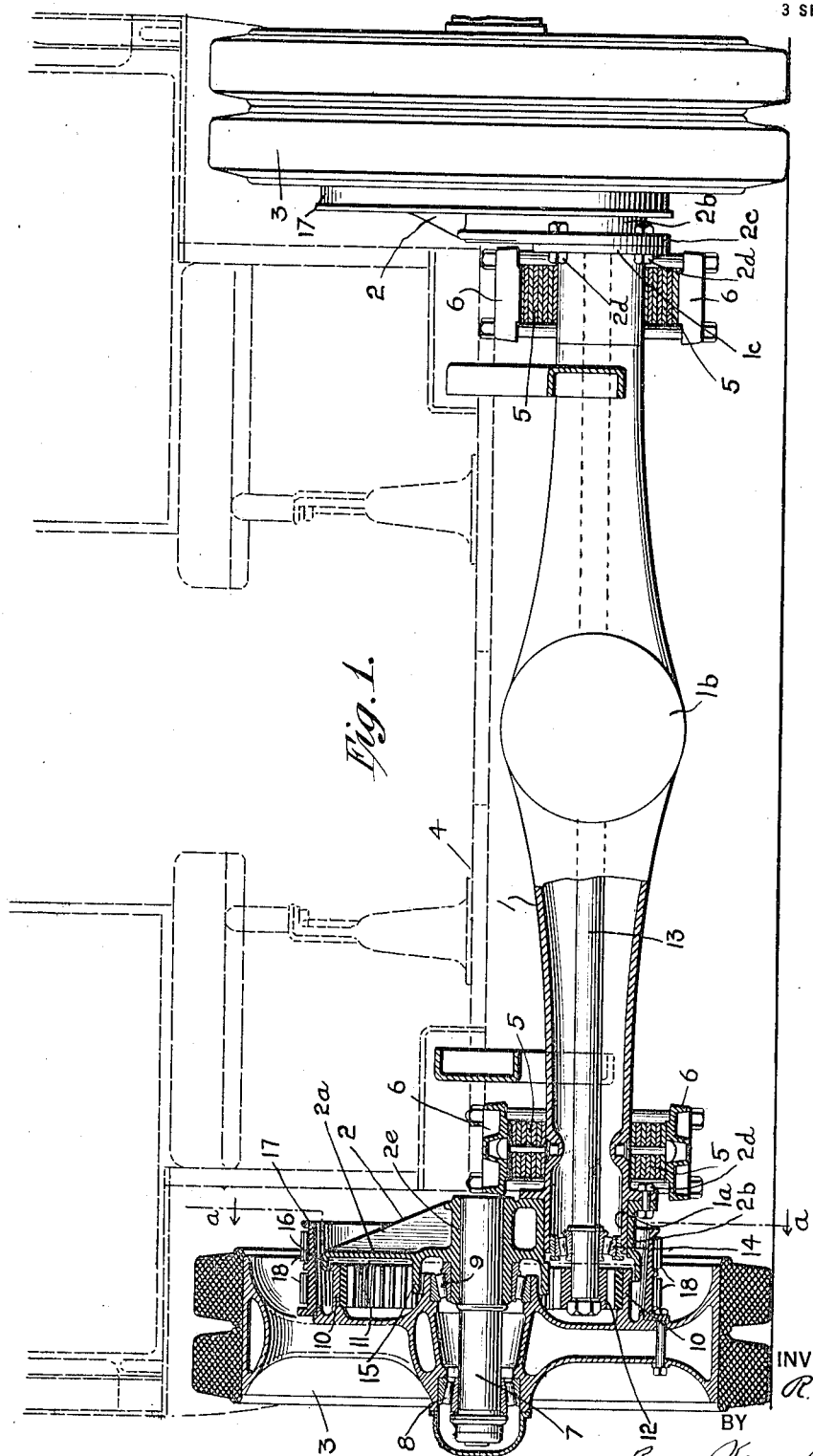
Figure 1 is a rear elevation partly in section of a rear axle drive equipment having my invention embodied therein.

Referring to the drawings:

1 designates a transverse load-supporting member. 2, 2, designate bracket-members applied to the opposite ends of the member 1 and extending vertically upward therefrom; and 3, 3, designate the ground or drive wheels rotatably sustained by said bracket-members on axes offset vertically from the axis of the load-supporting member. 4 designates the body of the vehicle sustained by the usual springs 5, which are in turn sustained by the load-supporting member adjacent to and inward of the bracket-members and clipped to the supporting member by the usual clips 6.

In accordance with my invention the load-carrying member is in the form of an integral hollow structure rectangular in cross section for the main portion of its length, and cylindrical in cross section at its extremities as at $1^a$, the central portion of the member being enlarged as at $1^b$ to constitute a casing for the differential gearing (not shown) and the said member tapering from its enlarged portion gradually to its outer extremities as clearly shown in Fig. 1.

At the points where the rectangular portions of the supporting member unite with its cylindrical extremities $1^a$, the said member is provided with outwardly extending annular flanges $1^c$ by means of which the end bracket-members 2 are firmly secured to the ends of the supporting member, as will be presently described.

The two bracket-members 2 are identical in form, construction and arrangement, and therefore a description of one will suffice. These bracket-members, as shown more particularly in Figs. 1, 3 and 4, consist each of a disk-like body $2^a$ which is provided at its lower side with an inwardly extending hollow boss $2^b$ which fits over the cylindrical extremity 1ᵃ of the transverse member 1, and which is firmly secured thereto by means of an annular flange 2ᶜ on the inner end of the boss, which abuts against the annular flange 1ᶜ on the supporting member and which flanges are firmly connected together by suitable means such as bolts 2ᵈ. Vertically above the boss 2ᵇ the bracket-member is provided centrally with a second hollow boss 2ᵉ which projects on both sides of the plane or body of said bracket-member, and firmly fixed in this central boss is a stud 7 on which the ground wheel is rotatably mounted. An antifriction bearing 8 is arranged between the wheel hub near its outer end and the outer end of the stud, and a second antifriction bearing 9 is arranged between the inner end of the wheel hub and the outer end of the central boss 2ᵉ, by which means the wheel is rotatably sustained jointly by the stud 7 and the bracket-member 2.

Each ground or driving wheel is formed some distance outwardly of its hub, with an inwardly extending gear ring 10 provided with an internal gear 11, with which gears on the two ground wheels mesh drive pinions 12 on the outer ends of horizontal driving shafts 13 mounted near their outer ends in bearings 14 at the outer extremities of the transverse supporting member and operatively connected at their inner end with the differential gearing before alluded to as being mounted in the central gear casing 1ᵇ, by which means the motion of the motor or engine is transmitted to the drive wheels.

Each bracket-member is further provided near its center with an outwardly extending annular flange 15 which overhangs and lies closely to the inner end of the hub and serves to prevent the entrance of dust or dirt to the hub bearings, and also to prevent the escape of lubricant therefrom. At its outer edge the bracket-member is provided with an outwardly extending peripheral flange 16 which overhangs and extends close to the inner edge of the gear ring 10 and likewise prevents the entrance of dust or dirt to the internal parts and prevents the escape of lubricant from the same.

Outward of the gear ring, the drive wheel is provided with an inwardly extending flange 17 which constitutes a brake drum for the usual brake straps 18.

From the foregoing description it will be noted that the axes of the drive wheels are disposed vertically above the axis of the load-supporting member, and that this load-supporting member gives support to the vehicle body; whereby the floor of the body is sustained at a low level, which is particularly advantageous in connection with motor buses to facilitate the entrance and exit of passengers, and is also advantageous in connection with motor trucks.

By forming the transverse load-supporting member as a single integral or unitary structure, the same will possess great strength, and joints will be avoided so that it may be produced economically.

It will be noted that the load of the vehicle body is supported by the supporting member closely adjacent the drive wheels and inward of the joint or connection between the ends of the supporting member and the bracket-members. This arrangement I deem of particular importance and advantage, in that the said joints are relieved from the direct stress of the load, and the load is supported at points on the supporting member where the stress will have the minimum effect in producing strains on the parts.

By connecting the bracket members with the load-supporting member through the medium of the abutting radial flanges on said parts, the supporting member will possess its full strength and will not be weakened, as would be the case if the connection of these parts were effected by extending the fastening bolts through the body of the member itself.

The central boss 2ᵉ on the bracket member by being extended on both sides of the body of the member, affords a long support or bearing for the stud 7, and enables the latter to be given rigid and solid support without danger of sagging while affording at its outer portion a bearing support for the inner end of the wheel hub.

In the foregoing description and accompanying drawings I have set forth my invention in the particular detailed form which I prefer to adopt but it will be manifest that these details may be variously changed and modified without departing from the spirit of the invention; and it will be understood that the invention is not limited to any particular form or construction of the parts except in so far as such limitations are specified in the claims.

Having thus described my invention, what I claim is:

1. In a motor vehicle, the combination of a transverse load-supporting member comprising a hollow structure formed between its ends with a differential gear case and terminating at its outer ends adjacent the drive wheels, and having outwardly extending flanges adjacent its outer extremities, bracket-members formed with openings surrounding the outer extremities of the supporting member and provided with outwardly extending flanges abutting against those on the supporting member, fastening devices securing said abutting flanges fixedly together, drive wheels journaled on the bracket-members, driving shafts extending within the supporting member, and gearing between the shafts and drive wheels.

2. In a motor vehicle, the combination of a transverse load-supporting member comprising a hollow structure rectangular in cross section for the main portion of its length and cylindrical in cross section at its outer extremities, bracket-members seated around said cylindrical extremities and secured to the structure, drive wheels journaled on the bracket-members, driving shafts extending within the supporting member, and gearing between the shafts and drive wheels.

3. In a motor vehicle, the combination of a transverse load-supporting member, a bracket-member applied to the end of the same and provided with a hollow central outwardly extending boss, a stud fixed in said boss, and a drive wheel provided with a hub surrounding the stud and having its inner end surrounding the outer end of the boss, said hub being rotatably sustained by the stud and boss.

4. In a motor vehicle, the combination of a transverse load-supporting member, a bracket-member applied to the end of the same and provided with a hollow central outwardly extending boss, a stud fixed in said boss, a drive wheel provided with a hub surrounding the stud and having its inner end surrounding the outer end of the boss, said hub being rotatably sustained by the stud and boss, and an annular flange extending outwardly from the bracket-member and overhanging the inner end of the hub.

5. In a motor vehicle, the combination of a transverse load-supporting member, a bracket-member attached to the end of the same and provided with a hollow boss extending on opposite sides of the body of the member, a stud fixed in said boss, and a drive wheel provided with a hub rotatably supported at its outer portion by the stud, and rotatably supported at its inner portion by the boss.

6. In a motor vehicle, the combination of a transverse, hollow load-supporting member, bracket-members provided each with a lower inwardly extending hollow boss and with an upper central hollow boss extending at opposite sides of the body of the member, said lower bosses being seated around the outer extremities of the load-supporting member and rigidly fastened thereto, studs fixed in the central bosses, drive wheels having their hubs surrounding the studs and having their inner ends surrounding the outer ends of the central bosses, the said drive wheels being rotatably sustained by said parts, gear rings extending inwardly from the driving wheels and provided with internal gears, driving shafts extending within the load-supporting member, driving pinions on the outer ends of the shafts engaging said internal gears, annular flanges on the bracket-members extending outwardly to closely surround the inner ends of the hubs, and annular flanges on the peripheral edges of the bracket-members extending outwardly to surround the gear rings on the drive wheels.

7. In a motor vehicle, the combination of a transverse load supporting member, a bracket member on the end of the same provided with a hollow outwardly extending boss, a stud fixed in said boss and projecting outwardly therefrom, and a drive wheel provided with a hub surrounding the stud and boss, said hub being rotatably supported at its outer portion by the stud, and being rotatably supported at its inner portion by the boss.

In testimony whereof, I have affixed my signature hereto.

REUBEN E. FIELDER.